(12) United States Patent
Burgman et al.

(10) Patent No.: US 6,451,930 B1
(45) Date of Patent: Sep. 17, 2002

(54) TOPCOAT WITH IMPROVED ADHESIVE QUALITIES

(75) Inventors: John W. Burgman, Gibsonia, PA (US); David C. Martin, Bethel Park, PA (US); Soner Kilic, Gibsonia, PA (US); Jane N. Valenta, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/524,830

(22) Filed: Mar. 14, 2000

(51) Int. Cl.$^7$ ................................................ C08G 77/18
(52) U.S. Cl. ...................... 525/452; 525/453; 525/456; 525/474
(58) Field of Search .................. 525/452, 453, 525/456, 474; 428/423.1, 425.6, 425.8; 528/28, 32

(56) References Cited

U.S. PATENT DOCUMENTS

| | | | |
|---|---|---|---|
| 3,479,328 A | 11/1969 | Nordstrom | 260/86.1 |
| 3,799,854 A | 3/1974 | Jerabek | 204/181 |
| 4,046,729 A | 9/1977 | Scriven | 260/29.2 TN |
| 5,084,541 A | 1/1992 | Jacobs, III et al. | 528/45 |
| 5,208,285 A | 5/1993 | Boyce et al. | 524/516 |
| 5,593,733 A | 1/1997 | Mayo | 427/407.2 |
| 5,830,578 A | * 11/1998 | Ono et al. | 428/446 |
| 5,972,422 A | 10/1999 | Harmon | 427/140 |
| 6,126,777 A | * 10/2000 | Wang | 156/307.5 |

FOREIGN PATENT DOCUMENTS

| | | |
|---|---|---|
| EP | 0 432 921 A1 | 6/1991 |
| EP | 0 710 676 A1 | 5/1996 |
| EP | 0 767 187 A1 | 4/1997 |
| EP | 0 995 778 A2 | 4/2000 |

* cited by examiner

Primary Examiner—D S Nakarani
(74) Attorney, Agent, or Firm—Deborah M. Altman; William J. Uhl

(57) ABSTRACT

A film-forming composition, typically a topcoat, having improved adhesion to certain commercially available adhesives. The composition includes a curable film-forming polymer, typically an acrylic and/or a polyester polymer, with carbamate and/or urea groups. The composition further includes a material containing one or more hydrolyzable silyl groups. The hydrolyzable silyl group-containing material optionally can be a polymeric or oligomeric. Also disclosed are a method of applying the above-described film-forming composition to a substrate and the coated article prepared by such a method.

18 Claims, No Drawings

TOPCOAT WITH IMPROVED ADHESIVE QUALITIES

BACKGROUND OF THE INVENTION

The present invention is directed to an additive for a film-forming composition to be applied to a substrate, typically as a topcoat, having improved adhesive properties.

Typically, when a windshield is affixed to the body of a vehicle, an adhesive is used to attach the windshield to the body. The adhesives commonly used for attachment of a windshield to the body of the vehicle are moisture-cured adhesives containing isocyanate (NCO) groups. These adhesives are commercially available from Essex Specialty Products, Inc. of Auburn Hills, Michigan, among other sources. The above described adhesives adhere well to many of the curable film-forming compositions used as vehicle topcoats. However, many of the commonly available adhesives do not adhere well to topcoats that contain carbamate and/or urea groups.

One solution to the problem of the failure of moisture-curable adhesives to adhere to carbamate and/or urea-containing topcoats is to prime the topcoat with a moisture curable urethane primer wherever the adhesive is to be applied. Although effective, this method adds an additional step to the process of adhering a windshield or other items to the vehicle body.

SUMMARY OF THE INVENTION

It is therefore an object of the present invention to provide a carbamate and/or urea group-containing topcoat composition to which NCO group-containing moisture curable adhesives will bond, forming a strong linkage between the adhesive and the topcoat.

The present invention provides a film-forming composition having improved adhesion to certain commercially available adhesives. This composition is typically applied to a substrate as a topcoat. The composition includes a resin component that includes a curable film-forming polymer with carbamate and/or urea groups. The curable film-forming polymer is typically an acrylic and/or polyester polymer. The composition also includes a material containing a hydrolyzable silyl group. The hydrolyzable silyl group is typically a group having the structure:

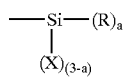

where R is a hydrogen or a monovalent hydrocarbon group, X is alkoxy, acyloxy, aminooxy, phenoxy, thioalkoxy or amino and (a) is an integer number from 0 to 2, wherein if (a) is 2, the two R groups can be the same or different and when (a) is 0 or 1, the two or three X groups can be the same or different.

Typically, (a) is 0 and X is methoxy or ethoxy. The silyl group-containing material can be monomeric, oligomeric or polymeric and can have more than one silyl group.

The present invention is also directed to a method for preparing a coated substrate which includes the step of applying to an exposed surface of a substrate, typically having one or more undercoating layers, a topcoat as described above. Lastly, the present invention is directed to a substrate, such as, without limitation, an automobile body, which is coated with the above-described film-forming composition.

DETAILED DESCRIPTION OF THE INVENTION

The use of numerical values in the various ranges specified in this application, unless expressly indicated otherwise, are stated as approximations as though the minimum and maximum values within the stated ranges were both preceded by the word "about." In this manner slight variations above and below the stated ranges can be used to achieve substantially the same results as values within the ranges.

Also, the disclosure of these ranges is intended as a continuous range including every value between the minimum and maximum values.

As used herein, except when otherwise noted, the term "polymer," and the like, shall refer to both polymeric and oligomeric materials.

The curable film-forming composition of the present invention is typically used to form a topcoat on a substrate. The composition is applied to the substrate and is subsequently cured. The composition includes a resin component, which includes at least two materials. The first material in the resin component is a film-forming polymer which is the primary curable constituent of the topcoat. The second material in the resin component is a material having one or more silyl groups where the silyl groups include one or more hydrolyzable groups. The hydrolyzable silyl group-containing material should be present in the composition in additive quantities so that the hydrolyzable silyl groups do not participate to any substantial extent in the curing of the resin component.

The film-forming polymer can be any polymer having active groups which are substantially carbamate and/or urea. A typical film-forming polymer having carbamate groups is a polymer or copolymer as described in U.S. Pat. Nos. 5,593,785 and 5,814,410, which are incorporated herein by reference. The polymer is typically an acrylic or a polyester-containing material. The typical film-forming polymer includes pendant and/or terminal groups, which are substantially carbamate and/or urea groups. By "substantially," it is understood that there can be other pendant or terminal groups in the polymer chain, such as hydroxyl groups, so long as a cured film, prepared from a composition including the polymer as a primary resin component, demonstrates about 100% adhesive failure and about 0% cohesive failure when a given adhesive is placed on the film and is cured, due, at lease in part, to the presence of carbamate and/or urea groups on the polymer chain. A typical carbamate and/or urea group-containing polymer is a polymer having pendant and/or terminal groups that are about 10% up to about 100% carbamate and/or urea. In other words, the polymer typically has a carbamate + urea equivalent weight of about 150–2000.

As aforementioned, the film-forming compositions of the invention preferably comprise one or more polymer materials having carbamate and/or urea functional groups. Carbamate and/or urea functional groups can be incorporated into the polymer prepared from polymerizable ethylenically unsaturated monomers by copolymerizing, for example, ethylenically unsaturated monomers with a carbamate functional vinyl monomer, such as a carbamate functional alkyl ester of acrylic or methacrylic acid. The polymerizable ethylenically unsaturated monomers can include, for example and without limitation, alkyl esters of (meth)acrylic acid including methyl (meth)acrylate, ethyl (meth)acrylate, butyl (meth)acrylate, 2-ethyl hexyl(meth)acrylate, stearyl (meth)acrylate, benzyl (meth)acrylate, cyclohexyl (meth) acrylate, lauryl (meth)acrylate, isobornyl (meth)acrylate, hydroxypropyl (meth)acrylate, hydroxyethyl (meth) acrylate, hydroxybutyl (meth)acrylate, trifluoroethyl (meth) acrylate, pentafluoropropyl (meth)acrylate, perfluorocyclohexyl (meth)acrylate, (meth)acrylonitrile, glycidyl (meth)

acrylate, dimethylaminoethyl (meth)acrylate, diethylaminoethyl (meth)acrylate, (meth)acrylamide, alpha-ethyl (meth)acrylamide, N-butoxymethyl (meth)acrylamide, N,N-dimethyl acrylamide, N-methyl acrylamide, acryloyl morpholine and N-methylol (meth)acrylamide, and vinyl aromatic compounds such as styrene, alpha-methyl styrene, and vinyl toluene. As used herein, "(meth)acrylate" and like terms is intended to include both acrylates and methacrylates. Useful carbamate functional alkyl esters can be prepared by reacting, for example, a hydroxyalkyl carbamate, such as the reaction product of ammonia and ethylene carbonate or propylene carbonate, with methacrylic anhydride. Other useful carbamate functional vinyl monomers include, for instance, the reaction product of hydroxyethyl methacrylate, isophorone diisocyanate, and hydroxypropyl carbamate; or the reaction product of hydroxypropyl methacrylate, isophorone diisocyanate, and methanol. Still other carbamate functional vinyl monomers may be used, such as the reaction product of isocyanic acid (HNCO) with a hydroxyl functional acrylic or methacrylic monomer such as hydroxyethyl acrylate, and those described in U.S. Pat. No. 3,479,328, incorporated herein by reference. Carbamate functional groups can also be incorporated into the acrylic polymer by reacting a hydroxyl functional acrylic polymer with a low molecular weight alkyl carbamate such as methyl carbamate. Also, hydroxyl functional acrylic polymers can be reacted with isocyanic acid to provide pendant carbamate groups. Likewise, hydroxyl functional acrylic polymers can be reacted with urea to provide pendant carbamate groups therefrom.

In one embodiment of the invention, the polymer prepared from polymerizable ethylenically unsaturated monomers can be prepared from ethylenically unsaturated, beta-hydroxy ester functional monomers, such as those derived from the reaction of an ethylenically unsaturated acid functional monomer, such as a monocarboxylic acid, for example, acrylic acid, and an epoxy compound which does not participate in the free radical initiated polymerization with the unsaturated acid monomer. Examples of such epoxy compounds are glycidyl ethers and esters. Suitable glycidyl ethers include glycidyl ethers of alcohols and phenols such as butyl glycidyl ether, octyl glycidyl ether, phenyl glycidyl ether and the like. Suitable glycidyl esters include those which are commercially available from Shell Chemical Company under the trade name CARDURA E and from Exxon Chemical Company under the trade name GLYDEXX-10.

Alternatively, the beta-hydroxy ester functional monomers are prepared from an ethylenically unsaturated, epoxy functional monomer, for example, glycidyl (meth)acrylate and allyl glycidyl ether, and a saturated carboxylic acid, such as a saturated monocarboxylic acid, for example isostearic acid.

The polymers prepared from polymerizable ethylenically unsaturated monomers can be prepared by solution polymerization techniques, which are well-known to those skilled in the art, in the presence of suitable catalysts such as organic peroxides or azo compounds, for example, benzoyl peroxide or 2,2'-azobis(2-methylbutanenitrile). The polymerization can be carried out in an organic solution in which the monomers are soluble by techniques conventional in the art. Alternatively, these polymers can be prepared by aqueous emulsion or dispersion polymerization techniques which are well-known in the art. The ratio of reactants and reaction conditions are selected to result in an acrylic polymer with the desired pendant functionality.

Carbamate functional polyesters can be prepared by first forming a hydroxyalkyl carbamate that can be reacted with the polyacids and polyols used in forming the polyester. Alternatively, terminal carbamate functional groups can be incorporated into the polyester by reacting isocyanic acid with a hydroxy functional polyester. Also, carbamate functionality can be incorporated into the polyester by reacting a hydroxyl polyester with a urea. Additionally, carbamate groups can be incorporated into the polyester by a transcarbamoylation reaction. Preparation of suitable carbamate functional group-containing polyesters are those described in U.S. Pat. No. 5,593,733 at column 2, line 40 to column 4, line 9, incorporated herein by reference.

A suitable polyester car be prepared by the esterification of a polycarboxylic acid or an anhydride thereof with a polyol and/or an epoxide. The polycarboxylic acids used to prepare the polyester consist primarily of monomeric polycarboxylic acids or anhydrides thereof having 2 to 18 carbon atoms per molecule. Among the acids that are useful are phthalic acid, hexahydrophthalic acid, adipic acid, sebacic acid, maleic acid, and other dicarboxylic acids of various types. Minor amounts of monobasic acids can be included in the reaction mixture, for example, benzoic acid, stearic acid, acetic acid, and oleic acid. Also, higher carboxylic acids can be used, for example, trimellitic acid and tricarballylic acid. Anhydrides of the acids referred to above, where they exist, can be used in place of the acid. Also lower alkyl esters of the acids can be used, for example, dimethyl glutarate and dimethyl terephthalate.

Polyols that can be used to prepare the polyester include diols such as alkylene glycols. Specific examples include ethylene glycol, 1,6-hexanediol, neopentyl glycol, and 2,2-dimethyl-3-hydroxypropyl-2,2-dimethyl-3-hydroxypropionate. Other suitable glycols include hydrogentated Bisphenol A, cyclohexanediol, cyclohexanedimethanol, caprolactone-based diols such as the reaction product of $\epsilon$-caprolactone and ethylene glycol, hydroxy-alkylated bisphenols, polyether glycols such as poly(oxytetramethylene)glycol, and the like. Although the polyol component can comprise all diols, polyols of higher functionality can also be used.

Polyurethane polymers containing terminal isocyanate or hydroxyl groups also can be used as the polymer in the film-forming compositions of the invention. The polyurethane polyols or NCO-terminated polyurethanes which can be used are those prepared by reacting polyols including polymeric polyols with polyisocyanates. Polyureas containing terminal isocyanate or primary and/or secondary amine groups which also can be used are those prepared by reacting polyamines including polymeric polyamines with polyisocyanates. The hydroxyl/isocyanate or amine/isocyanate equivalent ratio is adjusted and reaction conditions are selected to obtain the desired terminal groups. Examples of suitable polyisocyanates include those described in U.S. Pat. No. 4,046,729 at column 5, line 26 to column 6, line 28, incorporated herein by reference. Examples of suitable polyols include those described in U.S. Pat. No. 4,046,729 at column 7, line 52 to column 10, line 35, incorporated herein by reference. Examples of suitable polyamines include those described in U.S. Pat. No. 4,046,729 at column 6, line 61 to column 7, line 32 and in U.S. Pat. No. 3,799,854 at column 3, lines 13 to 50, both incorporated herein by reference.

Carbamate functional groups can be introduced into the polyurethane polymers by reacting a polyisocyanate with a polyester having hydroxyl and carbamate groups. Alternatively, the polyurethane can be prepared by reacting a polyisocyanate with a polyester polyol and a hydroxyalkyl carbamate or isocyanic acid as separate reactants. Examples of suitable polyisocyanates are aromatic isocyanates, such as 4,4'-diphenylmethane diisocyanate, 1,3-phenylene diisocyanate and toluene diisocyanate, and aliphatic polyisocyanates, such as 1,4-tetramethylene diisocyanate and 1,6-hexamethylene diisocyanate. Cycloaliphatic diisocyanates, such as 1,4-cyclohexyl diisocyanate and isophorone diisocyanate also can be employed.

Examples of suitable polyether polyols include polyalkylene ether polyols such as those having the following structural formula:

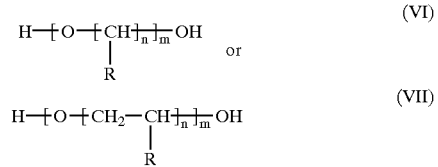

wherein the substituent R is hydrogen or a lower alkyl group-containing from 1 to 5 carbon atoms including mixed substituents, and n has a value typically ranging from 2 to 6 and m has a value ranging from 8 to 100 or higher. Exemplary polyalkylene ether polyols include poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, glycols such as ethylene glycol, 1,6-hexanediol, Bisphenol A, and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Specific examples of polyethers include those sold under the names TERATHANE and TERACOL, available from E. I. Du Pont de Nemours and Company, Inc.

Terminal carbamate functional groups can be incorporated into the polyether by reacting isocyanic acid with a hydroxy functional polyether. Also, carbamate functionality can be incorporated into the polyether by reacting a hydroxyl polyether with a urea. Additionally, carbamate groups can be incorporated into the polyether by a transcarbamoylation reaction.

Generally, the polymers having carbamate and/or urea reactive functional groups useful in the film-forming compositions of the invention have a weight average molecular weight (Mw) typically ranging from 1,000 to 20,000 preferably 1,500 to 15,000 and more preferably 2,000 to 12,000 as determined by gel permeation chromatography using polystyrene stardards.

The silyl group-containing material is a compound which contains a silyl group having one or more hydrolyzable groups attached thereto. The silyl group-containing material can be a monomeric molecule or it can be polymeric, including polysiloxanes. By "monomeric," it is meant that the material is not oligomeric or polymeric. The average number of silyl groups on the silyl group-containing material, can vary. Theoretically, the average number of silyl groups on the silyl group-containing material can be any number greater than 0.

The silyl group-containing material can be a non-polymeric compound having one or more silyl groups having a hydrolyzable group. The silyl groups of these compounds typically have the structure:

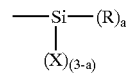

where R is a hydrogen or a monovalent hydrocarbon group, X is alkoxy, acyloxy, aminooxy, phenoxy, thioalkoxy or amino and (a) is an integer number from 0 to 2, wherein if (a) is 2, the two R groups can be the same or different and when (a) is 0 or 1, the two or three X groups can be the same or different. The silyl group can be attached to a large variety of monovalent organic compounds, including alkanes, siloxanes or combinations thereof. Examples of these silyl group-containing molecules are trimethoxysilane compounds such as alkyl trimethoxysilanes having the general formula $R-(CH_2)-Si(X)_3$, where X is alkoxy and R is one of $-NH_2$ and $-OOC-C(R_1)=CH_2$, where $R_1$ is $-H$ or $-CH_3$. Specific compounds include SILQUEST® A-174 silane (gamma-methacryloxypropyltrimethoxysilane), SILQUEST® A-1110 silane (gamma-aminopropyltrimethoxysilane), and SILQUEST® A-1100 silane (gamma-aminopropyltriethoxysilane) all of which are commercially available from CK Witco Corporation.

The non-polymeric molecule can also nave more than one silyl group. For instance, the compound can have the structure A-B-A' wherein A and A' can be the same or different and are the above-described silyl groups and B is a divalent organic linking group. One example of such a compound is 1,6-di-trimethoxysilyl hexane. In another example of such a compound, the compound is the product of the reaction of two precursor compounds having silyl groups. Each of the two compounds contains co-reactive organic groups such as, for example and without limitation, epoxy and acid: acid and hydroxyl; acid and amine; epoxy and hydroxyl; or isocyanate and hydroxyl. Thus, B can include a group that is the result of the joining of the two precursor compounds, such as, without limitation, an ether, an ester, a urethane, or an amide group.

The silyl group-containing material also can be polymeric in nature. These compounds can be homopolymers, copolymers or block polymers and can be of virtually any length and complexity so long as the molecule does not interfere with desired film-forming and curing properties of the coating composition. The polymers can be, without limitation, acrylics, polyesters, polyethers, polysiloxanes, urethanes or combinations thereof, so long as the polymer contains unreacted silyl groups having one or more hydrolyzable groups attached thereto as described above. The polymers are typically acrylic polymers which are the reaction product of one or more monomers in which at least one monomer has a pendant silyl group. The polymer can be a homopolymer of silyl group-containing acrylic monomers. More typically, the polymer is a co-polymer of two or more acrylic monomers, one of which includes a pendant silyl group.

An acrylic monomer which includes a pendant silyl group can be an oxyalkylsilyl monomer having the general structure:

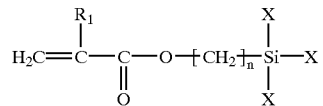

wherein $R_1$ is hydrogen or methyl, X is alkoxy. In one embodiment the oxyalkylsilyl acrylic monomer is gamma-methacryloxypropyltrimethoxysilane (SILQUEST® A-174 silane) A second monomer that, optionally, can be co-polymerized with the oxyalkylsilyl monomer is any vinyl monomer different from the oxyalkylsilyl monomer and which is copolymerizable with the oxyalkylsilyl acrylic monomer. An example of a suitable vinyl monomer is an acrylic monomer such as, without limitation, methyl (meth) acrylate, ethyl (meth)acrylate, butyl (meth)acrylate, ethylhexyl (meth)acrylate, stearyl (meth)acrylate, benzyl (meth) acrylate, cyclohexyl (meth)acrylate, lauryl (meth)acrylate, isobornyl (meth)acrylate, hydroxypropyl (meth)acrylate, hydroxyethyl (meth)acrylate, hydroxybutyl (meth)acrylate, trifluoroethyl (meth)acrylate, pentafluoropropyl (meth) acrylate, perfluorocyclohexyl (meth)acrylate, (meth) acrylonitrile, glycidyl (meth)acrylate, dimethylaminoethyl (meth)acrylate, diethylaminoethyl (meth)acrylate, (meth) acrylamide, alpha-ethyl (meth)acrylamide, N-butoxymethyl (meth)acrylamide, N,N-dimethyl acrylamide, N-methyl acrylamide, acryloyl morpholine and N-methylol (meth) acrylamide or combinations thereof.

Generally, the polymers having silyl functional groups useful in the film-forming compositions of the invention have a weight average molecular weight (Mw) typically ranging from 1,000 to 50,000 preferably 3,000 to 35,000 and more preferably 5,000 to 15,000 as determined by gel permeation chromatography using polystyrene standards.

An aminoplast crosslinking agent, typically a partially or fully alkylated aminoplast crosslinking agent is included in the film-forming composition of the present invention. The aminoplast crosslinking agent can have a plurality of functional groups, for example, alkylated methylol groups, that are reactive with the pendant carbamate groups present in the acrylic, polyester, polyurethane or polyether polymer.

Aminoplast resins, which include phenoplasts, as curing agents for hydroxyl, carboxylic acid and carbamate functional group-containing materials are well-known in the art. Aminoplast crosslinking agents are obtained from the reaction of formaldehyde with an amine and/or an amide. Melamine, urea, or benzoguanamine condensates are preferred. However, aminoplast condensates prepared from other amines or amides can be used, for example, aldehyde condensates of glycouril, which are useful in formulating powder coatings. Most often, formaldehyde is used as the aldehyde; however, other aldehydes such as acetaldehyde, crotonaldehyde, and benzaldehyde are also suitable.

By the term "fully alkylated" is meant that the alkylol groups associated with the reaction product of an aldehyde with an amine and/or an amide have been etherified to an extent that the alkoxy groups make up at least eighty (80) percent by weight of the functional groups.

The preferred aminoplast crosslinking agent is a melamine-formaldehyde condensate that has been fully alkylated, that is, the melamine-formaldehyde condensate contains methylol groups that have been further etherified with an alcohol, preferably one that contains 1 to 6 carbon atoms. Any monohydric alcohol can be employed for this purpose, including methanol, ethanol, n-butanol, isobutanol, and cyclohexanol. Most preferably, a blend of methanol and n-butanol is used. Suitable aminoplast resins are commercially available from Cytec Industries, Inc. under the trademark CYMEL® and from Solutia, Inc. under the trade name RESIMENE®.

The aminoplast curing agent is typically present in the compositions of the invention in an amount ranging from 2 to 60 weight percent, preferably from 10 to 50 weight percent, and more preferably from 15 to 45 weight percent based on the total weight of resin solids in the composition.

The film-forming composition of the present invention may also contain adjuvant curing agents such as a polyisocyanates. As used herein and in the claims, the term "polyisocyanate" is intended to include blocked (or capped) polyisocyanates as well as unblocked polyisocyanates. The polyisocyanate can be an aliphatic or an aromatic polyisocyanate or a mixture of the two. Diisocyanates may be used, although higher polyisocyanates such as isocyanurates of diisocyanates are preferred. Higher polyisocyanates can also be used in combination with diisocyanates. Isocyanate prepolymers, for example, reaction products of polyisocyanates with polyols can also be used. Mixtures of polyisocyanate curing agents can be used.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis (cyclohexyl isocyanate). Examples of suitable aromatic diisocyanates are p-phenylene diisocyanate, diphenylmethane-4,4'-diisocyanate and 2,4- or 2,6-toluene diisocyanate. Other diisocyanates include 1,3-bis(1-isocyanato-1-methylethyl)benzene. Examples of suitable higher polyisocyanates are triphenylmethane-4,4',4"-triisocyanate, 1,2,4-benzene triisocyanate and polymethylene polyphenyl isocyanate. Other polyisocyanates include biurets and isocyanurates of diisocyanates, including mixtures thereof, such as the isocyanurate of hexamethylene diisocyanate, the biuret of hexamethylene diisocyanate, and the isocyanurate of isophorone diisocyanate. Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used.

If the polyisocyanate is blocked or capped, any suitable aliphatic, cycloaliphatic, or aromatic alkyl monoalcohol known to those skilled in the art can be used as a capping agent for the polyisocyanate including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol.

Glycol ethers may also be used as capping agents. Suitable glycol ethers include ethylene glycol butyl ether, diethylene glycol butyl ether, ethylene glycol methyl ether and propylene glycol methyl ether. Other suitable capping agents include oximes, pyrazoles and lactams. One particular example is isophorone diisocyanate capped with methyl ethyl ketoxime.

When used, the polyisocyanate curing agent is present in an amount ranging from 1 to 40 weight percent, preferably from 1 to 20 weight percent, more preferably 1 to percent by weight based on the total weight of resin solids in the film-forming composition.

Examples of other blocked polyisocyanates include triazine compounds having the formula $C_3N_3(NHCOXR)_3$, wherein X is nitrogen, oxygen, sulfur, phosphorus, or carbon, and R is an alkyl group having one to twelve, preferably one to four, carbon atoms, or mixtures of such alkyl groups. X is preferably oxygen or carbon, more preferably oxygen. R preferably has one to eight carbon atoms, for example, methyl, ethyl, n-propyl, isopropyl, butyl, n-octyl and 2-ethylhexyl. R is preferably a mixture of methyl and butyl groups. Such compounds, and the preparation thereof, are described in detail throughout U.S. Pat. No. 5,084,541, incorporated herein by reference. Examples of triazine compounds are tris carbamoyl triazine or 1,2,5 triazine-2,4,6 tris-carbamic acid esters. When used, the triazine curing agent is present in the film-forming composition in an amount ranging from 1 to 40 weight percent, preferably from 1 to 20 weight percent, more preferably 1 to 10 percent by weight based on the total weight of resin solids in the film-forming composition.

Preferably, the film-forming composition has a calculated hydroxyl value of less than about 100, more preferably less than about 70, and most preferably about 50, based on the solid weight of the film-forming composition. The calculated hydroxyl value is calculated from the relative amounts of the various ingredients used in making the film-forming composition, rather than from an experimental titration measurement. Hydroxyl values greater than 100 are undesirable because they result in cured films with poor acid etch resistance.

Optionally, a diluent can be present in the film-forming composition that serves to reduce the viscosity of the coating composition. If the coating composition is solvent-borne, the diluent typically comprises an organic solvent. Examples of suitable solvents include alcohols such as ethanol, isopropanol, n-butanol, and the like; esters such as n-butyl acetate, n-hexyl acetate, pentyl propionate, and the like; ethers such as the monoethyl, monobutyl and monohexyl ethers of ethylene glycol and propylene glycol, and the like; ketones such as methyl ethyl ketone, methyl isobutyl ketone, diisobutyl ketone, and the like; aromatic hydrocarbons such as xylene, or toluene, and the like; aliphatic or alicyclic hydrocarbons such as the various petroleum naphthas and cyclohexane; and mixtures thereof.

When present, diluents are typically used at a level of up to about 60 percent, preferably up to about 40 percent by weight, based on the total weight of the film-forming composition.

The film-forming composition can also be used in particulate form, i.e., as a powder coating, in which the acrylic polymer and the oligomer or polymer containing the repeating ester groups are chosen such that they have a glass transition temperature (Tg) greater than 60° C. These materials can then be combined with an aldehyde condensate of glycouril, as previously mentioned, to form a powder film-forming composition.

The coating composition is a thermosetting composition and typically contains catalysts to accelerate the curing reactions. Typically, the catalysts are acidic materials. Sulfonic acids, substituted sulfonic acids and amine neutralized sulfonic acids are preferred, for example, p-toluene sulfonic acid, dodecyl benzene sulfonic acid, dinonylnaphthalene disulfonic acid, and the like. The catalyst is usually present in an amount of from 0.3 to 5.0 percent, preferably from 0.5 to 1.0 percent, the percentages based on the total weight of resin solids in the coating composition.

The coating composition can contain other optional ingredients, such as co-reactive resinous materials, plasticizers, anti-oxidants, UV light absorbers, surfactants, flow control agents, anti-settling agents, and the like. When present, these materials are generally used at a level of less than 25 percent, preferably less than 10 percent by weight, the percentages based on the total weight of resin solids in the coating composition. The coating composition can also contain pigment.

The film-forming composition can be applied to any of the various substrates to which it adheres. Specific examples of suitable substrates include metals, wood, glass, cloth, plastic, foam, elastomeric substrates, and the like. Typically, the substrate is metal or plastic. Optionally, the substrate could have been previously coated with an electrocoat primer and/or a primer surfacer and/or a pigmented basecoat and the film-forming composition of the present invention applied as a clear coat over the pigmented base coat to form a color plus clear composite coating.

The compositions can be applied by conventional means including brushing, dipping, flow coating, spraying, and the like. Preferably, they are applied by spraying. The usual spray techniques and equipment for air-spraying or electrostatic spraying can be used.

When the film-forming composition is used as a clear coat in a color plus clear composite coating, pigmented base coat is first applied to a substrate at a uniform film thickness of from about 0.25 to about 1.5 mils. The base coat is then "flashed," that is, it is left to stand at temperatures ranging from the ambient temperature to 80° C. for about 10 seconds to 30 minutes, before another coating composition is applied to it. Then, typically, the clear coating composition of the present invention is applied over the coated substrate in one or more coats to a uniform film thickness from 0.5 to 5.0 mils. The substrate is then flashed again and finally baked until the film is cured, typically for about 20 minutes to about 40 minutes at from about 100° C. to about 200° C. to produce the coated article.

The base coating compositions are those well known in the art as described, for example, in U.S. Pat. No. 4,681,811, column 1, line 56 to column 4, line 2.

Illustrating the invention are the following examples that are not to be considered as limiting the invention to their details. All parts and percentages in the examples, as well as throughout the specification, are by weight unless otherwise indicated.

RESIN EXAMPLE 1

A carbamate functional acrylic was prepared from the following ingredients:

| Ingredient | Weight in parts |
|---|---|
| Acrylic polymer[1] (90% solids in DOWANOL PM) | 1614.4 |
| Methyl carbamate | 240.3 |
| Butyl stannoic acid | 3.05 |
| Triphenyl phosphite | 3.05 |

[1]Made from hydroxypropylacrylate, butyl methacrylate and alpha-methyl styrene dimer.

A suitable reactor equipped with a thermocouple, overhead stirrer, nitrogen inlet and a reflux condenser was charged with the above ingredients. The reaction mixture was heated to 145° C. under a nitrogen blanket. At this temperature, reflux was observed. The reaction mixture was held at reflux for one hour. After the hold period was complete, the reflux condenser was removed, and the reactor equipped for distillation (short column, still head, thermocouple, and receiver) at atmospheric pressure. Distillate began to come over at 139° C. The temperature of the reaction was gradually raised to 151° C. to maintain a steady rate of distillation. At this point, 87 parts of distillate had been collected. The reaction mixture was then cooled to 140° C. and equipped for simple vacuum distillation (still head, vacuum adapter, receiver flask). Distillation was resumed under reduced pressure; the pressure inside the reactor was gradually reduced to maintain distillation until a reactor pressure of 60-mm Hg was attained. When the distillation was essentially stopped, the reaction mixture was sampled and the hydroxyl value found to be 36. The additional distillate collected totaled 158 parts. The contents of the reactor were then diluted with 410 parts of ethyl 3-ethoxypropionate and 410 parts DOWANOL PM. The weight average molecular weight was about 10,400 and the number average molecular weight was about 2,900, as determined by gel permeation chromatography using polystyrene standards.

RESIN EXAMPLE 2

A carbamate-functional polyester was prepared from the following ingredients:

| Ingredient | Weight in parts |
| --- | --- |
| Polyester[2] | 6916.4 |
| Methyl carbamate | 1081.4 |
| Butyl stannoic acid | 14.4 |
| Triphenyl phosphite | 14.4 |
| DOWANOL PM | 1297.7 |

[2]made from 2,2,4-trimethyl-1,3-pentanediol/trimethylol propane/neopentyl glycol/hexahydrophthalic anhydride in a 22.7:10.6:17.5:49.2 weight ratio, 100% solids.

A suitable reactor was charged with the above ingredients and equipped with a thermocouple, overhead stirrer, nitrogen inlet and a reflux condenser. The mixture was heated to 141° C. under a nitrogen blanket. At this temperature reflux was observed. The reaction mixture was held at reflux for one hour. After the hold period was complete, the reflux condenser was removed, and the reactor equipped for distillation (short column, still head, thermocouple, and receiver) at atmospheric pressure. Distillate began to come over at 132° C. The temperature of the reaction was gradually raised to 151° C. to maintain a steady rate of distillation. At this point 422 parts of distillate had been collected. The reaction mixture was then cooled to 145° C. and equipped for simple vacuum distillation (still head, vacuum adapter, receiver flask). Distillation was resumed under reduced pressure; the pressure inside the reactor was gradually reduced to maintain distillation until a reactor pressure of 60-mm Hg was attained. When the distillation was essentially stopped, the reaction mixture was sampled and the hydroxyl value found to be acceptable (32.6). The additional distillate collected totaled 1007 parts. The contents of the reactor were cooled and then diluted with 1295 parts of DOWANOL PM and 1648 parts of DOWANOL PM Acetate. The final resin solution was found to have a weight average molecular weight of about 2,500 and a number average molecular weight of about 1,200, as determined by gel permeation chromatography using polystyrene standards.

RESIN EXAMPLE 3

The following initial charge and feeds were used in the preparation of gamma-methacryloxypropyltrimethoxysilane containing solution polymer.

| Ingredients | Parts by Weight |
| --- | --- |
| Initial Charge | |
| n-Butyl acetate | 627.50 |
| Ethyl acetate | 269.10 |
| Feed 1 | |
| SILQUEST A-174[3] (gamma-methacryloxypropyl-trimethoxysilane) | 2,392.70 |
| 2-Ethylhexyl acrylate | 598.20 |
| Feed 2 | |
| n-Butyl acetate | 209.10 |
| Ethyl acetate | 90.00 |
| VAZO-67[4] | 90.00 |
| Feed 3 | |
| n-Butyl acetate | 41.80 |
| Ethyl acetate | 18.20 |
| Feed 4 | |
| n-Butyl acetate | 20.90 |
| Ethyl acetate | 9.10 |
| Feed 5 | |
| n-Butyl acetate | 41.80 |
| Ethyl acetate | 18.20 |
| VAZO-67 | 30.00 |
| Feed 6 | |
| n-Butyl acetate | 20.90 |
| Ethyl acetate | 9.10 |

[3]Gamma-methacryloxypropyltrimethoxysilane, available from CK Witco Corporation.
[4]2,2'-azobis(2-methylbutanenitrile) from E.I. duPont de Nemours & Co., Inc.

The initial charge was heated in a reactor with agitation to reflux temperature (103° C.). Feeds 1 and 2 were initiated simultaneously and continued in a substantially continuous manner over a period of 3 hours while maintaining the reaction mixture at reflux temperature. At the completion of Feeds 1 and 2, the addition funnels were rinsed with Feeds 3 and 4, and the reaction mixture was held for 1 hour at reflux temperature. Then Feed 5 was added over 30 minutes and the addition funnel was rinsed with Feed 6. The reaction mixture was held for two hours at reflux temperature to complete the polymerization. The reaction mixture was cooled and filtered. The resultant solution polymer had a weight average molecular weight of about 12,200 as determined by gel permeation chromatography using polystyrene standards. The Gardner-Holdt viscosity was H.

RESIN EXAMPLE 4

The following initial charge and feeds were used in the preparation of gamma-methacryloxypropyltrimethoxysilane containing solution polymer.

| Ingredients | Parts by Weight |
| --- | --- |
| Initial Charge | |
| n-Butyl acetate | 69.02 |
| Ethyl acetate | 29.60 |
| Feed 1 | |
| SILQUEST A-174 | 181.00 |
| 2-Ethylhexyl acrylate | 148.10 |
| Feed 2 | |
| n-Butyl acetate | 23.00 |
| Ethyl acetate | 9.90 |
| VAZO-67 | 9.90 |
| Feed 3 | |
| n-Butyl acetate | 4.60 |
| Ethyl acetate | 2.00 |

| Ingredients | Parts by Weight |
|---|---|
| Feed 4 | |
| n-Butyl acetate | 2.30 |
| Ethyl acetate | 1.00 |
| Feed 5 | |
| n-Butyl acetate | 4.60 |
| Ethyl acetate | 2.00 |
| VAZO-67 | 3.30 |
| Feed 6 | |
| n-Butyl acetate | 2.30 |
| Ethyl acetate | 1.00 |

The initial charge was heated in a reactor with agitation to reflux temperature. Feeds I and 2 were initiated simultaneously and continued in a substantially continuous manner over a period of 3 hours while maintaining the reaction mixture at reflux temperature. At the completion of Feeds 1 and 2, the addition funnels were rinsed with Feeds 3 and 4, and the reaction mixture was held for 1 hour at reflux temperature. Then Feed 5 was added over 30 minutes and the addition funnel was rinsed with Feed 6. The reaction mixture was held for 2 hours at reflux temperature to complete the polymerization. The reaction mixture was cooled and filtered.

The resultant solution polymer had a weight average molecular weight of about 12,100 as determined by gel permeation chromatography using polystyrene standards. The Gardner-Holdt viscosity was K.

RESIN EXAMPLE 5

The following initial charge and feeds were used in the preparation of gamma-methacryloxypropyltrimethoxysilane containing solution polymer.

| Ingredients | Parts by Weight |
|---|---|
| Initial Charge | |
| n-Butyl acetate | 69.02 |
| Ethyl acetate | 29.60 |
| Feed 1 | |
| SILQUEST A-174 | 98.70 |
| 2-Ethylhexyl acrylate | 230.30 |
| Feed 2 | |
| n-Butyl acetate | 23.00 |
| Ethyl acetate | 9.90 |
| VAZO-67 | 9.90 |
| Feed 3 | |
| n-Butyl acetate | 4.60 |
| Ethyl acetate | 2.00 |
| Feed 4 | |
| n-Butyl acetate | 2.30 |
| Ethyl acetate | 1.00 |
| Feed 5 | |
| n-Butyl acetate | 4.60 |
| Ethyl acetate | 2.00 |
| VAZO-67 | 3.30 |
| Feed 6 | |
| n-Butyl acetate | 2.30 |
| Ethyl acetate | 1.00 |

The initial charge was heated in a reactor with agitation to reflux temperature. Feeds 1 and 2 were initiated simultaneously and continued in a substantially continuous manner over a period of 3 hours while maintaining the reaction mixture at reflux temperature. At the completion of Feeds 1 and 2, the addition funnels were rinsed with Feeds 3 and 4, and the reaction mixture was held for 1 hour at reflux temperature. Then Feed 5 was added over 30 minutes and the addition funnel was rinsed with Feed 6. The reaction mixture was held for 2 hours at reflux temperature to complete the polymerization. The reaction mixture was cooled and filtered.

The resultant solution polymer had a weight average molecular weight of about 11,900 as determined by gel permeation chromatography using polystyrene standards. The Gardner-Holdt viscosity was H.

RESIN EXAMPLE 6

The following initial charge and feeds were used in the preparation of gamma-methacryloxypropyltrimethoxysilane containing solution polymer.

| Ingredients | Parts by Weight |
|---|---|
| Initial Charge | |
| SOLVESSO-100[5] | 197.2 |
| Feed 1 | |
| SILQUEST A-174 | 526.4 |
| n-Butyl methacrylate | 131.6 |
| Feed 2 | |
| SOLVESSO-100 | 13.2 |
| Feed 3 | |
| Di-tert-butylperoxide | 32.9 |
| SOLVESSO-100 | 65.8 |
| Feed 4 | |
| SOLVESSO-100 | 6.6 |
| Feed 5 | |
| Di-tert-butylperoxide | 6.6 |
| SOLVESSO-100 | 13.2 |
| Feed 6 | |
| SOLVESSO-100 | 6.6 |

[5]aromatic hydrocarbon solvent mixture available from Exxon Chemical Co.

The initial charge was heated in a reaction vessel with agitation to reflux temperature. Feeds 1 and 3 were initiated simultaneously and continued in a substantially continuous manner over a period of 3 hours while maintaining the reaction mixture at reflux temperature. At the completion of Feeds 1 and 3, the addition funnels were rinsed with Feeds 2 and 4, and the reaction mixture was held for 1 hour at reflux temperature. Then Feed 5 was added over 30 minutes and the addition funnel was rinsed with Feed 6. The reaction mixture was held for 2 hours at reflux temperature to complete the polymerization. The reaction mixture was cooled and filtered. The Gardner-Holdt viscosity was A+.

RESIN EXAMPLE 7

The following initial charge and feeds were used in the preparation of gamma-methacryloxypropyltrimethoxysilane homopolymer:

| Ingredients | Parts by Weight |
| --- | --- |
| Initial Charge | |
| SOLVESSO-100 | 98.60 |
| Feed 1 | |
| SILQUEST A-174 | 329.00 |
| Feed 2 | |
| SOLVESSO-100 | 32.90 |
| Di-tert-butylperoxide | 16.50 |
| Feed 3 | |
| SOLVESSO-100 | 6.60 |
| Feed 4 | |
| SOLVESSO-100 | 3.30 |
| Feed 5 | |
| SOLVESSO-100 | 6.60 |
| Di-tert-butylperoxide | 3.30 |
| Feed 6 | |
| SOLVESSO-100 | 3.30 |

The initial charge was heated in a reactor with agitation to reflux temperature (160° C.). Feeds 1 and 2 were initiated simultaneously and continued in a substantially continuous manner over a period of 3 hours while maintaining the reaction mixture at reflux temperature. At the completion of Feeds 1 and 2, the addition funnels were rinsed with Feeds 3 and 4, and the reaction mixture was held for 1 hour at reflux temperature. Then Feed 5 was added over 30 minutes and the addition funnel was rinsed with Feed 6. The reaction mixture was held for 2 hours at reflux temperature to complete the polymerization. The reaction mixture was cooled and filtered. The resultant solution polymer had a weight average molecular weight of about 4,600 as determined by gel permeation chromatography using polystyrene standards. The Gardner-Holdt viscosity was A.

FORMULATION EXAMPLE 1
Carbamate Functional Acrylic

A clear film-forming composition was prepared by mixing together, in order, the following ingredients:

| Ingredient | Solid Wt. (g) | Solution Wt. (g) |
| --- | --- | --- |
| Xylene | | 9.51 |
| Aromatic 100 | | 9.51 |
| Tinuvin 328[6] | 1.39 | 1.39 |
| Tinuvin 900[7] | 1.39 | 1.39 |
| Acrylic Microgel Dispersion[8] | 2.30 | 7.67 |
| Silica Dispersion[9] | 9.66 | 22.5 |
| RESIMENE 757[10] | 35 | 36.1 |
| Ethanol | | 4.8 |
| Carbamate functional Acrylic (Resin Example 1) | 54.8 | 84.8 |
| Tinuvin 292[11] | 0.35 | 0.35 |
| Dislon OX-60[12] | 0.06 | 0.12 |
| DDBSA[13] | 0.80 | 1.14 |

[6]Substituted benzotriazole UV Light stabilizer available from Ciba Geigy Corporation.
[7]Substituted benzotriazole UV Light stabilizer available from Ciba Geigy Corporation.
[8]A non-aqueous dispersion of an acrylic polymer formed from ethyleneglycol dimethacrylate, styrene, butyl acrylate and methyl methacrylate.
[9]Fumed silica grind.
[10]A fully alkylated methoxy/butoxy functional aminoplast available from Solutia, Inc.
[11]Sterically hindered amine light stabilizer available from Ciba Geigy Corporation.
[12]Additive from King Industries.
[13]Dodecyl benzene sulfonic acid solution.

FORMULATION EXAMPLE 2
Carbamate Functional Acrylic+4% A174/2EHA (80/20)

A clear film-forming composition was prepared by mixing together the following ingredients:

| Ingredient | Solid Wt. (g) | Solution Wt. (g) |
| --- | --- | --- |
| Clear film-forming Composition from Formulation Example 1 | 105.8 | 179.3 |
| Silane Additive (Resin Example 3) | 4.0 | 5.5 |

FORMULATION EXAMPLE 3
Carbamate Functional Polyester

A clear film-forming composition was prepared by mixing together, in order, the following ingredients:

| Ingredient | Solid Wt. (g) | Solution Wt. (g) |
| --- | --- | --- |
| Xylene | | 9.51 |
| Aromatic 100 | | 9.51 |
| Tinuvin 328 | 1.39 | 1.39 |
| Tinuvin 900 | 1.39 | 1.39 |
| Acrylic Microgel Dispersion | 2.30 | 7.67 |
| Silica Dispersion | 9.66 | 22.47 |
| RESIMENE 757 | 35 | 36.1 |
| Ethanol | | 4.8 |
| Carbamate functional Polyester (Resin Example 2) | 54.8 | 79.4 |
| Tinuvin 292 | 0.35 | 0.35 |
| Dislon OX-60 | 0.06 | 0.12 |
| DDBSA | 0.80 | 1.14 |

FORMULATION EXAMPLE 4
Carbamate Functional Polyester +4% A174/2EHA (80/20)

A clear film-forming composition was prepared by mixing together the following ingredients:

| Ingredient | Solid Wt. (g) | Solution Wt. (g) |
| --- | --- | --- |
| Clear film-forming Composition from Formulation Example 3 | 105.8 | 173.9 |
| Silane Additive (Resin Example 3) | 4.0 | 5.5 |

FORMULATION EXAMPLE 5
60 Carbamate Functional Polyester/40 Carbamate Functional Acrylic A clear film-forming composition was prepared by mixing together, in order, the following ingredients:

| Ingredient | Solid Wt. (g) | Solution Wt. (g) |
| --- | --- | --- |
| Xylene | | 9.51 |
| Aromatic 100 | | 9.51 |
| Tinuvin 328 | 1.39 | 1.39 |

-continued

| Ingredient | Solid Wt. (g) | Solution Wt. (g) |
|---|---|---|
| Tinuvin 900 | 1.39 | 1.39 |
| Acrylic Microgel Dispersion | 2.30 | 7.67 |
| Silica Dispersion | 9.66 | 22.47 |
| RESIMENE 757 | 35 | 36.1 |
| Ethanol |  | 4.8 |
| Carbamate functional Polyester (Resin Example 2) | 32.9 | 47.6 |
| Carbamate Functional Acrylic (Resin Example 1) | 21.9 | 33.9 |
| Tinuvin 292 | 0.35 | 0.35 |
| Dislon OX-60 | 0.06 | 0.12 |
| DDBSA | 0.80 | 1.14 |

FORMULATION EXAMPLE 6
60 Carbamate Functional Polyester/40 Carbamate Functional Acrylic+0.1–100% A174/2EHA Ladder (80/20)

Each clear film-forming composition was prepared by mixing together the shown ingredients in Table 1, below:

FORMULATION EXAMPLE 7
60 Carbamate Functional Polyester/40 Carbamate Functional Acrylic+1% A174/2EHA (55/45)

A clear film-forming composition was prepared by mixing together the following ingredients:

| Ingredient | Solid Wt. (g) | Solution Wt. (g) |
|---|---|---|
| Clear film-forming Composition from Formulation Example 5 | 105.8 | 176.0 |
| Silane Additive (Resin Example 4) | 1.0 | 1.4 |

FORMULATION EXAMPLE 8
60 Carbamate Functional Polyester/40 Carbamate Functional Acrylic+1% A174/2EHA (30/70)

A clear film-forming composition was prepared by mixing together the following ingredients:

TABLE 1

| Ingredient | 0.1% A174/2EHA (80/20) | | 0.5% A174/2EHA (80/20) | | 1% A174/2EHA (80/20) | | 2% A174/2EHA (80/20) | | 4% A174/2EHA (80/20) | |
|---|---|---|---|---|---|---|---|---|---|---|
|  | Solid Wt. | Soln Wt. | Solid Wt. | Soln Wt. | Solid Wt. | Soln Wt. | Solid Wt. | Soln Wt. | Solid Wt. | Soln Wt. |
| Clear film-forming Composition from Formulation Example 5 | 105.8 | 176.0 | 105.8 | 176.0 | 105.8 | 176.0 | 105.8 | 176.0 | 105.8 | 176.0 |
| Silane Additive (Resin Example 3) | 0.10 | 0.14 | 0.50 | 0.70 | 1.0 | 1.4 | 2.0 | 2.7 | 4.0 | 5.5 |
| Clear film-forming Composition from Formulation Example 5 | 105.8 | 176.0 | 105.8 | 176.0 | 105.8 | 176.0 | 105.8 | 176.0 | 105.8 | 176.0 |
| Silane Additive (Resin Example 3) | 5.0 | 6.8 | 10 | 13.7 | 20 | 27.4 | 35 | 47.9 | 40 | 58.8 |

| Ingredient | 45% A174/2EHA (80/20) | | 50% A174/2EHA (80/20) | | 100% A174/2EHA (80/20) | |
|---|---|---|---|---|---|---|
|  | Solid Wt. | Soln Wt. | Solid Wt. | Soln Wt. | Solid Wt. | Soln Wt. |
| Clear film-forming Composition from Formulation Example 5 | 105.8 | 176.0 | 105.8 | 176.0 | 105.8 | 176.0 |
| Silane Additive (Resin Example 3) | 45 | 66.2 | 50 | 68.5 | 100 | 137.0 |

| Ingredient | Solid Wt. (g) | Solution Wt. (g) |
|---|---|---|
| Clear film-forming Composition from Formulation Example 5 | 105.8 | 176.0 |
| Silane Additive (Resin Example 5) | 1.0 | 1.4 |

FORMULATION EXAMPLE 9

60 Carbamate Functional Polyester/40 Carbamate Functional Acrylic+4% A174/BMA (80/20)

A clear film-forming composition was prepared by mixing together the following ingredients:

| Ingredient | Solid Wt. (g) | Solution Wt. (g) |
|---|---|---|
| Clear film-forming Composition from Formulation Example 5 | 105.8 | 176.0 |
| Silane Additive (Resin Example 6) | 4.0 | 6.0 |

FORMULATION EXAMPLE 10

60 Carbamate Functional Polyester/40 Carbamate Functional Acrylic+1% A1100

A clear film-forming composition was prepared by mixing together the following ingredients:

| Ingredient | Solid Wt. (g) | Solution Wt. (g) |
|---|---|---|
| Clear film-forming Composition from Formulation Example 5 | 105.8 | 176.0 |
| SILQUEST A1100[14] | 1.0 | 1.0 |

[14]Gamma-aminopropyltriethoxysilane, available from CK Witco Corporation.

FORMULATION EXAMPLE 11

60 Carbamate Functional Polyester/40 Carbamate Functional Acrylic+1% A1110

A clear film-forming composition was prepared by mixing together the following ingredients:

| Ingredient | Solid Wt. (g) | Solution Wt. (g) |
|---|---|---|
| Clear film-forming Composition from Formulation Example 5 | 105.8 | 176.0 |
| SILQUEST A1110[15] | 1.0 | 1.0 |

[15]Gamma-aminopropyltrimethoxysilane, available from CK Witco Corporation.

FORMULATION EXAMPLE 12

60 Carbamate Functional Polyester/40 Carbamate Functional Acrylic+3% MKC MS60

A clear film-forming composition was prepared by mixing together the following ingredients:

| Ingredient | Solid Wt. (g) | Solution Wt. (g) |
|---|---|---|
| Clear film-forming Composition from Formulation Example 5 | 105.8 | 176.0 |
| MKC MS60[16] | 3.0 | 3.0 |

[16]an alkoxypolysiloxane (methoxy), commercially available from Mitsubishi Chemical America, Inc.

FORMULATION EXAMPLE 13

60 Carbamate Functional Polyester/40 Carbamate Functional Acrylic+3% MKC MS60-B30

A clear film-forming composition was prepared by mixing together the following ingredients:

| Ingredient | Solid Wt. (g) | Solution Wt. (g) |
|---|---|---|
| Clear film-forming Composition from Formulation Example 5 | 105.8 | 176.0 |
| MKC MS60-B30[17] | 3.0 | 3.0 |

[17]an alkoxypolysiloxane (methoxy/butoxy), commercially available from Mitsubishi Chemical America, Inc.

FORMULATION EXAMPLE 14

60 Carbamate Functional Polyester/40 Carbamate Functional Acrylic+4% A174 Homopolymer A clear film-forming composition was prepared by mixing together the following ingredients:

| Ingredient | Solid Wt. (g) | Solution Wt. (g) |
|---|---|---|
| Clear film-forming Composition from Formulation Example 5 | 105.8 | 176.0 |
| Silane Additive (Resin Example 7) | 4.0 | 5.7 |

EXPERIMENTAL DETAILS

The film-forming compositions of Examples 1–14 were applied to pigmented basecoats to form color plus clear composite coatings over a steel substrate with electrocoat primer and primer surfacer. The basecoat used for the examples is commercially available from PPG Industries, Inc. and is identified as WDBC422G (green metallic). The primer surfacer used is commercially available from PPG Industries, Inc. and is identified as 1177–225A. The electrocoat used on the steel is commercially available from PPG Industries, Inc. and is identified as ED5000.

The basecoat was spray applied in two coats to the primed electrocoated steel panels at a temperature of about 75° F. (24° C.). Approximately a 60 seconds flash time was allowed between the two basecoat applications. After the second basecoat application, a 90 seconds flash time was allowed at about 75° F. (24° C.) before the application of the clear coating composition. The clear coating compositions of Examples 1–14 were each applied to a basecoated panel in two coats with a 60 seconds flash at 75° F. (24° C.) allowed between coats. The composite coating was allowed to air flash at about 75° F. (24° C.) for 8–10 minutes before baking at 285° F. (141° C.) to cure both the basecoat and the clearcoat. The panels were baked in a horizontal position. The colored panel for each clearcoat example was baked for 25 minutes and used to test for adhesion.

In order to test for adhesion, the adhesion of the clearcoat to the windshield adhesive, a bead of windshield adhesive was applied to the clearcoat surface within 1–4 hours following the 25 minutes at 285° F. (141° C.) bake. The two windshield adhesives used for Examples 1–14 are commercially available from Essex Speciality Products Company and are identified as 15618 and 15625.

Approximately a 5 mm×5 mm×250 mm adhesive bead was placed on the cured color plus clear composite. The adhesive plus the color plus clear composite was cured for 72 hours at about 75° F. (24° C.) and 20–50% relative humidity. The cured adhesive bead was cut with a razor blade. A cut was made through the adhesive bead at a 60° angle at 12mm intervals while pulling back the edge of the adhesive at a 180° angle. A minimum of 10 cuts was done for each system. The desired result is described as 100% cohesive failure (CF). Cohesive failure (CF) occurs when the integrity of the adhesive bead is lost as a result of cutting and pulling rather than the bond between the adhesive bead and the clearcoat surface. The adhesion results over the green metallic basecoat are summarized in Table 2, below.

TABLE 2

| Clearcoat | CC Description | 15618 Adhesive Percent Cohesive Failure | 15625 Adhesive Percent Cohesive Failure |
|---|---|---|---|
| Example 1 | Carbamate Acrylic | 0% | 0% |
| Example 2 | Ex. 1 + 4% A174/2EHA (80/20) | 100% | 100% |
| Example 3 | Carbamate Polyester | 0% | 0% |
| Example 4 | Ex. 3 + 4% A174/2EHA (80/20) | 100% | 100% |
| Example 5 | 60/40 Carbamate Polyester/Carbamate Acrylic | 0% | 0% |
| Example 6 | Ex. 5 + 0.1%–100% A174/2EHA (80/20)[18] | 100% | 100% |
| Example 7 | Ex. 5 + 1% A174/2EHA (55/45) | 100% | 100% |
| Example 8 | Ex. 5 + 1% A174/2EHA (30/70) | 100% | 100% |
| Example 9 | Ex. 5 + 4% A174/BMA (80/20) | 100% | 100% |
| Example 10 | Ex. 5 + 1% A1100 | 100% | 100% |
| Example 11 | Ex. 5 + 1% A1110 | 100% | 100% |
| Example 12 | Ex. 5 + 3% MKC MS60 | 100% | 100% |
| Example 13 | Ex. 5 + 3% MKC MS60-B30 | 100% | 100% |
| Example 14 | Ex. 5 + 4% A174 homopolymer | 100% | 100% |

[18]0.1%–50% A174/2EHA (80/20) were tested and demonstrated 100% C.F. At 50%, there was a small amount of incompatibility. A 100% A174/2EHA (80/20) sample was prepared, but was untestable. At 100%, there was a large amount of incompatibility.

Table 2 shows that in the absence of the silane additives (Examples 1, 3 and 5) the adhesive beads do not adhere to the clearcoat surface indicating 0% cohesive failure. In contrast, clearcoats containing a silane additive (Examples 2, 4 and 6–14) adhere strongly to the adhesive beads (100% cohesive failure) and the mode of failure occurs within the adhesive bead itself.

We claim:

1. A curable film-forming composition, comprising a resin component comprised of:
   a. a film-forming polymer having carbamate and/or urea groups; and
   b. a polymeric or oligomeric material containing a hydrolyzable silyl group.

2. The curable film-forming composition of claim 1, in which the material containing a hydrolyzable silyl group has at least one silyl group per molecule having the structure,

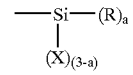

where R is a hydrogen or a monovalent hydrocarbon group, X is alkoxy, acyloxy, aminooxy, phenoxy, thioalkoxy or amino and (a) is an integer number from 0 to 2, wherein if (a) is 2, the two R groups can be the same or different and when (a) is 0 or 1, the two or three X groups can be the same or different.

3. The curable film-forming composition of claim 2, in which a is 0.

4. The curable film-forming composition of claim 2, in which X is alkoxy.

5. The curable film-forming composition of claim 4, in which X is one of methoxy, ethoxy, isopropoxy and butoxy.

6. The curable film-forming composition of claim 2, wherein the material containing a hydrolyzable silyl group has two or more of the hydrolyzable silyl groups per molecule.

7. The curable film-forming composition of claim 1, in which the silyl group-containing material is the reaction product of:
   a. an oxyalkylsilyl acrylic monomer having the formula:

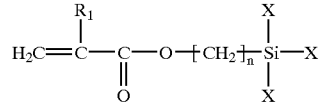

wherein $R_1$ is hydrogen or methyl, X is alkoxy, acyloxy, aminooxy, phenoxy, thioalkoxy or amino and n is 1–6; and
   b. optionally, one or more vinyl monomers different from the oxyalkylsilyl monomer and which is copolymerizable with the oxyalkylsilyl acrylic monomer.

8. The curable film-forming composition of claim 7, in which the reaction product is a copolymer of the oxyalkylsilyl acrylic monomer and one or more alkyl esters of (meth)acrylic acid.

9. The curable film-forming composition of claim 8, in which the weight percent of the oxyalkylsilyl acrylic monomer in the reaction is about 25% to 100%.

10. The curable film-forming composition of claim 9, in which the weight percent of the one or more alkyl esters of (meth)acrylic acid in the reaction is about 0% to 75%.

11. The curable film-forming composition of claim 7, in which $R_1$ is methyl.

12. The curable film-forming composition of claim 7, in which the vinyl monomer (b) is selected from the group consisting of methyl (meth)acrylate, ethyl (meth)acrylate, butyl (meth)acrylate, ethylhexyl (meth)acrylate, stearyl (meth)acrylate, benzyl (meth)acrylate, cyclohexyl (meth) acrylate, lauryl (meth)acrylate, isobornyl (meth)acrylate, hydroxypropyl (meth)acrylate, hydroxyethyl (meth) acrylate, hydroxybutyl (meth)acrylate, trifluoroethyl (meth) acrylate, pentafluoropropyl (meth)acrylate, perfluorocyclohexyl (meth)acrylate and combinations thereof.

13. The curable film-forming composition of claim 7, in which n is 3.

14. The curable film-forming composition of claim 7, in which the oxyalkylsilyl acrylic monomer is gamma-methacryloxypropyltrimethoxysilane.

15. The curable film-forming composition of claim 7, in which X is $C_{1-6}$ alkoxy.

16. The curable film-forming composition of claim 7, wherein X is methoxy.

17. The curable film-forming composition of claim 1, in which the resin component of the curable film-forming composition includes up to 50% of the silyl group-containing material.

18. The curable film-forming composition of claim 17, in which the resin component of the curable film-forming composition includes about 0.1% to 5% of the silyl group-containing material.

\* \* \* \* \*